Nov. 19, 1963  R. E. NELSON  3,111,008

THERMOELECTRIC CONTROL SYSTEM

Filed Nov. 14, 1962  2 Sheets-Sheet 1

Nov. 19, 1963  R. E. NELSON  3,111,008
THERMOELECTRIC CONTROL SYSTEM
Filed Nov. 14, 1962  2 Sheets-Sheet 2

United States Patent Office 3,111,008
Patented Nov. 19, 1963

3,111,008
THERMOELECTRIC CONTROL SYSTEM
Robert E. Nelson, Waltham, Mass., assignor to Energy Conversion, Inc., Cambridge, Mass., a corporation of Massachusetts
Filed Nov. 14, 1962, Ser. No. 237,504
25 Claims. (Cl. 62—3)

This invention relates to a thermoelectric control system.

In order to obtain thermoelectric cooling using the Peltier effect, it is essential that there be a net current flow through a thermoelectric couple or heat pump in one direction. Furthermore, relationship between Joulean and Peltier effects is such that there is always one particular net current flow rate (hereinafter sometimes referred to as $I_{opt.}$) at which optimum cooling (in terms of heat pumping per unit of time) occurs in any particular system. In consequence, the prior art has typically used a D.C. source, typically in a circuit adapted to produce a continuous current up to the $I_{opt.}$ level, for energizing any thermoelectric unit involved. Even when for one reason or another, typically to save expense and as a compromise, a rectified alternating current source has been used, the approach has been to smooth out a rectified sine wave, as by means of a choke, to decrease rate of wave rise and wave height variation rate below that characteristic of a rectified sine wave and to approach the non-wave form of D.C. current.

I have found that alternating current is affirmatively desirable as a source of energy for thermoelectric devices. It is not at all just that it is often more readily available or cheaper, as has motivated the compromises above mentioned. Rather, an alternating current source has been found to make for better control of temperature in a controlled enclosure because in many applications it provides a system less affected by ambient temperature variations. Furthermore, use of such a source facilitates adjustment of impedance, which is low in thermoelectric circuits, by means of transformers. It is accordingly one object of the present invention to provide a thermoelectric control system which can take advantage of the benefits of use of an alternating current source, properly handled in accordance with the teachings hereof, which may or may not be in turn created from a source of direct current.

I have discovered that alternating current may be used with effectiveness greatly improved over anything known or suspected in the prior art by taking an approach directly in conflct with the teachings of the prior art. In short, instead of attempting to smooth rectified waves into a configuration approaching that of direct current by decreasing rate of wave rise and fall, wave rise and fall rate (voltage or current vs. time) both maximum and average are desirably increased over that characteristic of a sine wave; and in the most preferred embodiment a square wave should be used, with current rising from and falling completely to zero with the lowest possible times of rise and fall. I have found that this permits operation if desired with alternating current at levels nearer $I_{opt.}$, and in most preferred embodiments, if maximum heat pumping is desired, time of and time between rise and fall may be reduced to a very low level, producing with alternating current almost full time operation at an $I_{opt.}$ level. Accordingly, it is a further object of the present invention to provide a temperature control system in which current supplied to a thermoelectric couple has a rate of rise or fall greater than that of a sine wave.

I have also discovered that accuracy and stability of control of temperature within wider ranges of setting and with greater accuracy at a particular setting, as within an enclosure or chamber subject to the system, may be greatly increased if current is passed through any thermoelectric couple elements over at least a portion ordinarily of each wave, current being cut off at other times during each wave, control being by varying the width of the wave ordinarily, particularly during cooling. Heat pumping may in this manner be more nearly linearlized with respect to average current input, and error signal control accuracy greatly improved. Control is greatest if the current is passed through the thermoelectric elements in width modulable square waves, which enables almost perfect stability and linearity, but substantial improvement of accuracy and control is found in this way using even ordinary rectified sine waves, for example, particularly if the sine waves are clipped along a Y axis parallel to exclude from the heat pump at least 20% of the width of each wave, the clipped portions being at either the beginning or end of a wave, or both. Linearity of heat pumping relative to average heat pumping current and temperature control accuracy is greater over wide and practical operating ranges with pulse (i.e., wave) width modulation even using a rectified sine wave in the heat pumping circuit through any thermoelectric element than can be obtained using unpulsed pure direct current or choked rectified sine wave alternating current. In the former case it is perhaps more natural to speak of pulse width modulation as the technique being used, but this is actually true of both cases. In both the width of each wave (180° total unclipped) is varied by clipping away a portion of the wave (square, sine or otherwise) along a line parallel to the Y axis (current being plotted as Y against time as X). This discovery is of the most fundamental importance, and makes possible controlling the temperature of a small enclosure, for example designed for housing a sensitive instrument, to a desired temperature within ±0.001° C., such accurate controlled-temperature chambers being useful for example to enclose low-drift electronic circuits (for stabilization), infra-red detectors, biological specimens, and sensitive instrument and electronic components. Accordingly, it is a further object of the present invention to provide a thermoelectric control system in which rate of heat pumping in temperature control is varied by varying the width of waves of current (alternating in regular periodicity) passing through a thermoelectric couple.

I have discovered furthermore a thermoelectric control system in which temperature may be controlled usefully and with accuracy at a desired level whether it is required of the system to supply to a controlled enclosure or area cooling alone, heating alone, or even, at different times, of both. I have discovered that the latter may be done with great accuracy in a preferred embodiment by using, for both heating and cooling, waves of the same configuration (whether square or otherwise), although of course oppositely directed from the X axis (of opposite polarity), width modulated (clipped along a Y axis parallel) for temperature control if desired. I have found that this may be achieved for example by using a different amplitude in the heating direction than in the cooling direction, or by skipping some waves altogether when in a heating phase. It is accordingly a further object to provide a thermoelectric system in which temperature may be controlled with stability and with approximate linearity whether it is necessary to withdraw or add heat to the thing being controlled.

It is a further object to provide new thermoelectric control systems and circuits embodying the above and other objects, features, and advantages which will become apparent in the course of the following discussion of preferred embodiments of the invention, taken in conjunction with the attached drawings, in which.

In the circuit diagrams, letters or numbers enclosed in a small circle mean that circuit portions identically designated are connected in series.

Figures 1, 2:
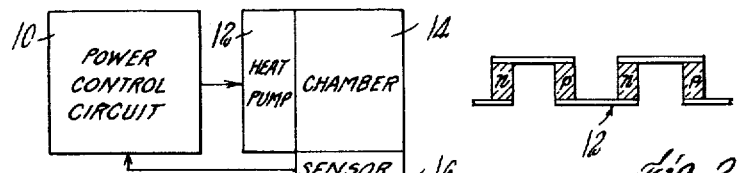
FIG. 1 is a schematic drawing of a system of the invention.
FIG. 2 is a diagrammatic drawing of a heat pumping unit, showing schematically a pair of thermoelectric couples connected electrically in series and thermally in parallel.

FIG. 1 shows diagrammatically a control system according to the invention, the power control circuit 10 including a power source and control circuitry determining delivery of power therefrom through heat pump 12 which may include one or more thermoelectric couples (each with a "p" and an "n" thermoelement, as is well understood in the art) connected electrically in series and thermally in parallel with controlled chamber 14, a sensor 16 in heat communication with the chamber providing a signal acting on the power control circuit 10. FIG. 2 is a diagrammatic sketch of a thermoelectric heat pump 12 with two thermoelectric couples of the character mentioned.

Figure 3:
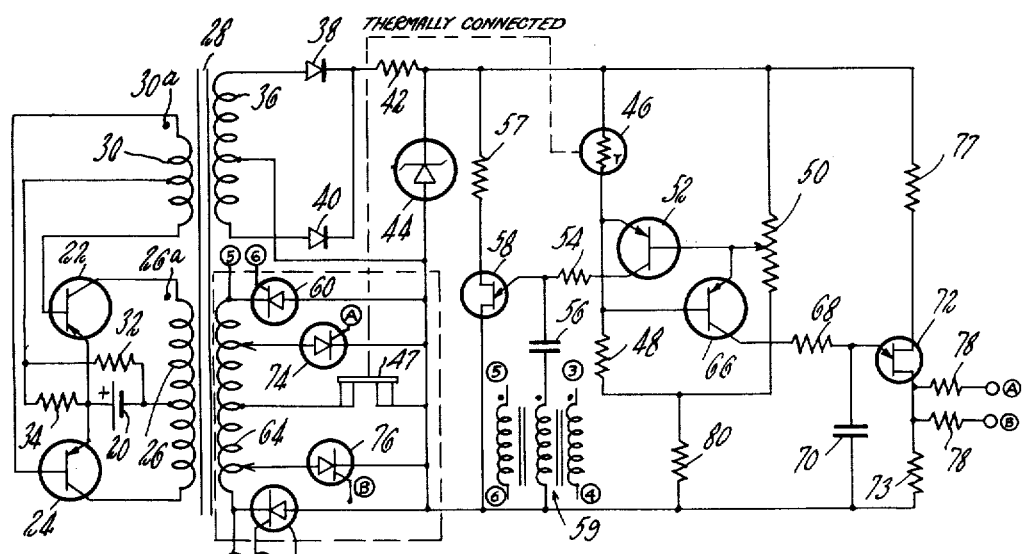
FIG. 3 is a circuit diagram of a preferred embodiment which achieves control, either heating or cooling as required, using square waves polarized as required, width modulated for control, and having a less (but consistent) amplitude in a heating than in a cooling direction.

A preferred circuit embodying the invention is shown in FIG. 3. In this embodiment, control with extreme accuracy and linearity is possible, whether heating or cooling is required, by width modulated square waves of selectively (e.g., during a cooling phase) a single polarity.

In the embodiment shown, the ultimate power source is 12 v. battery 20, but an alternating current power source is provided therefrom by means of a saturation type oscillator power circuit. Battery 20 is connected in series with the emitters of power transistors (e.g., 2N301) 22 and 24, the collectors of which are connected in series through power or primary winding 26 of transformer 28, into the center of which winding a tap is connected in series with the battery 20. The bases of transistors 22 and 24 are connected in series through feedback winding 30 of the transformer 28, which produces an E.M.F. of about 0.5 v. Connected to a center tap thereon is a line connected respectively through resistances 32 (150 ohms) and 34 (5 ohms) to opposite sides of battery 20. The transformer 30 is wound for common polarity at 26a and 30a. Between resistance 34 and the battery 20 is a common junction with the line between the two transistor emitters. When current flows, the power transistors not being identically perfect, flow in one is greater than the other. Since their emitter polarities are opposite, flow through the one in which greater flow is taking place tends to oppose flow through the other, thus increasing flow through the one and decreasing it through the other. This effect is accentuated by the feedback winding 30, which owing to current through the transistor of greater flow (at a given time) imposes on the base of the other a voltage opposing flow therethrough. Therefore, all current is almost instantaneously passing through one of the two transistors, and it continues to flow therethrough until the core of transformer 28 is saturated. At that time voltage begins to drop off, as is well understood, with a tendency toward generation of an oppositely directed current, transistor base imposition of flow opposing voltage shifts, and almost instantaneously all current is flowing through the other transistor in the opposite direction, i.e., with the opposite polarity. The saturated core oscillator power circuit just described thus produces an unrectified alternating square (generally square cornered, i.e.) wave output or power source (for other components and control and heat pumping circuits). The resistances 32 and 34 give a small amount of forward bias to both transistors 22 and 24 and guarantee proper start-up.

Control winding 36 of transformer 28 thus provides unrectified square waves, at about 42 volts. This winding is center-tapped, however, each end of the winding being in series through respectively diodes 38 and 40 (e.g., 40H diodes) with resistance 42 (150 ohms), Zener diode 44, and the center tap. This control rectifying circuit thus produces through its center tap and diodes rectified 21 v. A.C. waves, which are clipped across their tops (i.e., along X-axis parallels) in Zener diode 44 to 20 v., the excess energy being dissipated in resistor 42. The use in this manner of the Zener diode has the advantage not only of screening out any spiked switching transients, but as well as making irrelevant any fluctuations within relevant ranges owing to source variations in the voltage produced in the winding 36. The trigger circuit input wave is thus a rectified 20 volt square wave.

This rectified 20 volt square wave is now placed across a Wheatstone bridge comprising in one side thermistor 46 (e.g., 2 kiloohms at 25° C.) which is thermally connected with thermoelectric unit or element 47 and a chamber of two cubic inches (not shown) to and from which the thermoelectric unit couples of 10 (electrically in series and thermally in parallel to provide a heat pumping module with $I_{opt.}$ = 5 amp.) is in heat conducting relation, to produce a variable resistance reflecting the chamber temperature. In the same side of the Wheatstone bridge is resistance (e.g., 1 kiloohm) 48. The other side comprises variable resistance 50, the movable center contact to which permits division into two resistance portions in varying ratios, to provide for setting at a desired chamber temperature.

When temperature in the chamber is at the desired point, no voltage or error signal is produced across the Wheatstone bridge.

If temperature in the chamber is higher than desired, a voltage is produced across the Wheatstone bridge in a direction causing flow of current, with amplification therein, through transistor (e.g., 2N525) 52 and resistance 54 to charge condenser (0.1 farad) 56. When voltage across double base diode 58 (e.g., 2N491) reaches a predetermined amount of 2 volts, it fires, discharging the condenser 56 through pulse transformer 59 (1:1:1 ratio, $L_p$=15 mh.). Resistance 57 (470 ohms) limits base-to-base current of transistor 58. This in turn produces a trigger pulse closing silicon controlled rectifiers (e.g., 2N1770A) 60 and 62. Voltage and current waves in output winding 64 of transformer 28 are not rectified, and polarity across one silicon controlled rectifier is different from that across the other. Even though triggered, one silicon controlled rectifier thus remains open for lack of a properly polarized voltage thereacross. Accordingly, in each half cycle even after triggering current flows through only one of them. Flow alternates between the two, in effect thus producing rectified heat-pumping current through the thermoelectric couple 47. The wave periodicity in winding 64 is the same no matter when the trigger is firing, but the effective width of the wave fed through the thermoelectric unit 47 is only that portion after the trigger fires, the initial portion before firing being in effect clipped off along a line parallel to the Y axis (along which current is plotted, time being on the X axis). The greater the error signal, the sooner the trigger, and so the greater the width of the pulse, or the fraction of full wave width, put to heat pumping effect. When voltage drops at 180°, the closed silicon control rectifier automatically opens.

When the error signal produced in the Wheatstone bridge is opposite in voltage, indicating the chamber to be too cool, a signal flowing, with amplification therein, through transistor 66, and proportional to the amount of temperature error, occurs, producing with resistance 68 (2.2 kiloohms), condenser 70 (0.1 farad), and double base diode 72 a trigger pulse through resistance 73 (39 ohms) and directly acting on silicon controlled rectifiers 74 and 76 (2N1770A), to tend to close circuits therethrough, although here too polarity is in only one of the two circuits on each half cycle proper to maintain the silicon controlled rectifier in closed condition (even then, of course, only until therethrough voltage again drops to zero). Resistance 77 (390 ohms) limits base-to-base current of transistor 72. Resistances 78 (22 ohms each) decouple the gate circuits of the silicon controlled rectifiers 74 and 76. In this manner rectified waves of current are passed through thermoelectric unit 47 in the opposite or heating direction (one rectified wave per 180° or half-cycle, though each half-cycle wave is like the next).

The voltage required to discharge the condensers 56 and 70 is proportional to the voltage across the double base diodes 58 and 72, respectively, so that even if some error signal is present but insufficient to build up a critical or approximately 2 v. charge on the respective while the control circuit wave is at full amplitude, the condensers must discharge when said wave drops off at the end of each half-cycle. This is important, so that triggering remains always a function of error signal operating over one half cycle alone.

In the heating direction, Joulean and Peltier effects are of curse additive, and linearity of gain, or temperature drop change with current, is promoted by decreasing the amount of current substantially in the heating direction for each half cycle of current operation. In the present circuit, there is a different (although constant) pulse amplitude in a heating direction than in the cooling direction; as will be apparent, the cooling circuits are connected across more turns of winding 64, to produce a greater voltage (four, as compared to three, in this embodiment). In this circuit linearity through zero and heat pumping capacity are maximized by making the amplitude for cooling $I_{opt.}$ for the thermoelectric unit (which contains 10 thermoelectric couples), and the heating amplitude a fraction of $I_{opt.}$, preferably about $\sqrt{2}-1$ times $I_{opt.}$.

The resistance 80 (1 kiloohm) limits voltage across the Wheatstone bridge and, consequently, power dissipation in thermistor 46. The resistance 80 also properly biases transistors 52 and 66.

Figure 4:
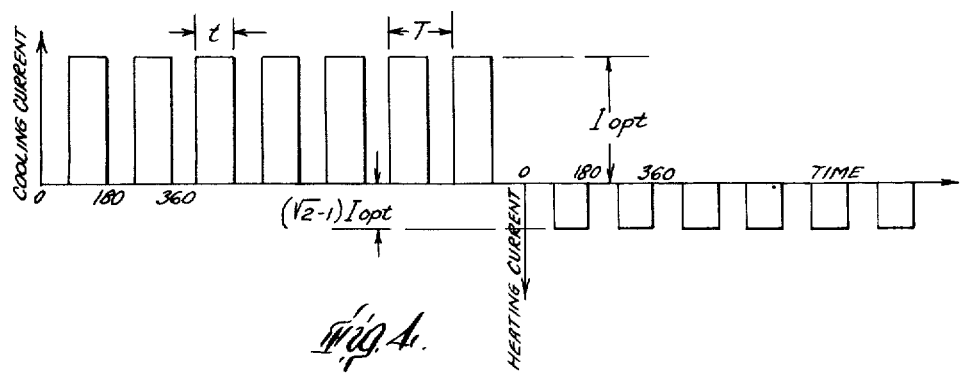
FIG. 4 is a view of the wave form achieved in the heat pumping unit at particular times of particular heating and cooling requirements using the circuit of FIG. 3.

FIG. 4 shows the wave form the circuit of FIG. 3 is capable of providing in heat pump 47. The portion on the left side of the figure shows the system in a particular cooling phase. "T" designates a full half cycle. The letter "t" designates the width of the wave actually passing through the heat pumping circuit, the remainder of it at its initial portion being clipped off by the circuit along a Y axis parallel. The portion to the right shows the system in a particular heating phase.

Figure 5:
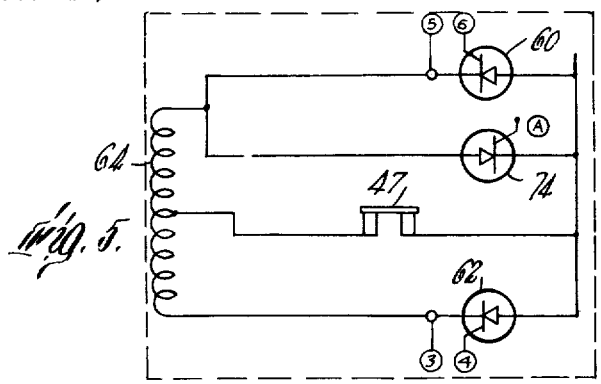
FIG. 5 is a circuit diagram of an embodiment which is like that of FIG. 3 except that the circuit shown is substituted for that of the dashed box of FIG. 3, so that waves in a heating direction have the same amplitude as in a cooling, but only half the effective or heat-pumping frequency.
Figure 6:
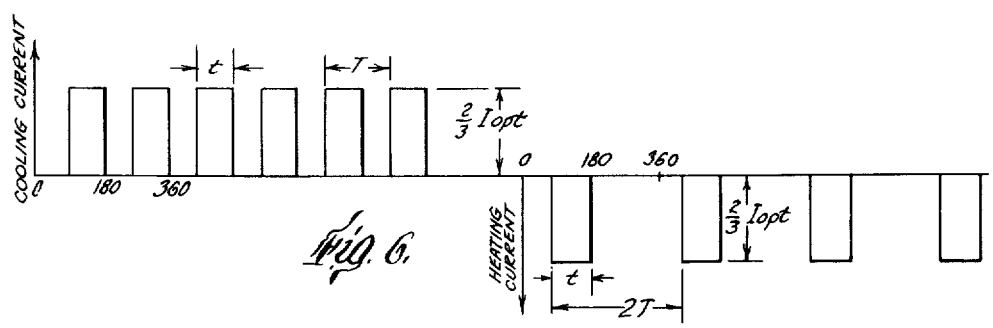
FIG. 6 is a view of typical heat pumping wave forms achieved in the circuit of FIG. 5.

In FIG. 5 is shown a modified circuit, the circuitry of FIG. 5 being substituted for that within the dashed box of FIG. 3, other circuitry being the same as in FIG. 3. In this embodiment, voltage is the same in both a heating and cooling direction, all the winding 64 being used in both directions. However, in this embodiment preferably the total pulse amplitude is set at less than $I_{opt.}$, namely ⅔ $I_{opt.}$, as shown in FIG. 6, the left hand portion of which illustrates the wave form provided by this modified circuit in one cooling circumstance, and the right hand portion of which illustrates the wave form provided thereby in one heating circumstance. Also, in this embodiment, on alternate half cycles no current passes in a heating direction, thus making for any given width modulation only half as much current move if the system is in a heating phase as if it is in a cooling phase.

Figure 7:
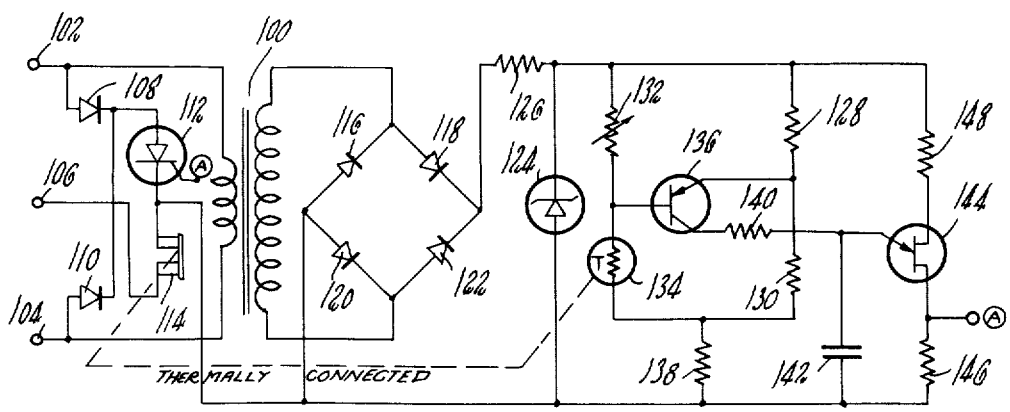
FIG. 7 is a circuit diagram of an embodiment in which heat pumping is in a cooling direction alone by means of rectified sine waves, control being by clipping on Y axis parallels.

An additional circuit according to the invention is shown in FIG. 7. In this embodiment, temperature control is possible at various settings with considerable gain constancy through width modulation of a rectified sine wave used to power the thermoelectric heat pump.

The power control circuit of this embodiment includes a power supply circuit portion (to the left of transformer 100), and control portion (to the right of said transformer). The entire power control circuit here operates from a power source (not shown) supplying alternating current of 6.3 volts.

In the power supply circuit portion, the power input is across terminals 102 and 104, and is center tapped at 106 as well. Voltage between terminals 102 and 106 is 180° out of phase with voltage between terminals 104 and 106. Each set of said terminals is separately in series through a silicon diode or rectifier 108 and 110 respectively (e.g., 1N1199–A) with switching means constituting silicon controlled rectifier 112 (e.g., C35u) and a thermoelectric heat pump 114. The thermoelectric heat pump comprises ten thermoelectric couples, connected electrically in series and thermally in parallel, and in this embodiment has an optimum current for maximum heat pumping of 10 amperes. Current of one polarity only may flow, owing to the presence of diodes 108 and 110, so that a rectified sine wave results; in view of the 180° phase relationship, current never flows through both circuits simultaneously. No current flows in either, of course, unless silicon controlled rectifier 112 is closed, and it is normally open. However, it is closed by a trigger signal at A given as will be hereinafter described by the control portion or trigger circuit. It automatically opens again when voltage across and current through it drop to zero; i.e., every half cycle.

The trigger circuit in this embodiment also draws on the 6.3 v. alternating current source through terminals 102 and 104 for power, and this is converted in transformer 100 to 110 v. A.C. having a constant phase relationship with the waves of heat pumping current in unit 114. Rectifying means are provided by means of diodes 116, 118, 120, and 122 (each, e.g., 1N1695), which are arranged in a full wave bridge, to produce a rectified sine wave.

This rectified sine wave is then placed across an X-axis parallel clipper or flat-top converter which takes the form of Zener (or breakdown) diode (e.g., 1N1527) 124, which has a clipping level of 20 volts (i.e., no current flows through diode 124 until voltage reaches 20, and thereafter voltage remains at 20 however much current flows). There are thus produced waves which are not only rectified, but have tops which are flat across a good portion of their width. Resistance 126 (e.g., 1500 ohms) is provided to absorb energy corresponding to the clipped off top portions of the waves.

Flat-top waves resulting from the preceding are placed across a Wheatstone bridge error signalling means made up of fixed resistances 128 and 130 (e.g., 300 ohms), variable resistor 132 (e.g., 50 k.), and thermistor 134 (e.g., 5 k. at ambient temperature). The thermistor 134 is associated with a chamber (not shown in FIG. 7) in heat exchange contact with heat pump 114, and has a resistance which varies with the temperature of the chamber. The desired temperature in the chamber is set by adjusting the variable resistor 132. When the thermistor 134 has the same resistance, and thus the desired temperature, the bridge is balanced and there is no error signal, emitter-to-base voltage of transistor 136 being zero. If the temperature is more than that desired, the resistance of thermistor 134 decreases, and an error is signalled by an unbalance emitter-to-base voltage in the transistor 136, the greater the error, the greater being the voltage. The resulting base current is amplified 50 times or so in transistor 136, which may suitably be, for example, of type 2N525. The resistance 138 (e.g., 1 k.) serves to limit voltage across the Wheatstone bridge and limit, consequently, the power dissipation in the thermistor 134. Also, resistance 138 properly biases transistor 136.

The error-signalling means above described imposes a voltage governed by the size of the error and variable in flat-top waves on capacitor 142 (e.g., 0.25 microfarad). When, in consequence, voltage across double base diode (or unijunction) transistor (e.g., 2N491) 144 reaches a critical figure, about 2 volts, it fires. This transistor has high base-to-base resistance until the emitter is forward biased, after which conductivity modulation lowers its resistance. When the transistor 144 fires, the capacitor 142 is discharged through the transistor 144 and through resistance 146, to generate thereacross a sharp trigger pulse. Base-to-base current of transistor 144 is limited by resistance 148 (e.g., 390 ohms).

Figure 8:
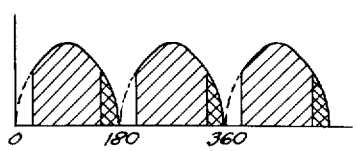
FIG. 8 is a view of typical heat pumping wave forms achieved in the circuit of FIG. 7.

The trigger pulse serves to close silicon controlled rectifier 112, permitting current to pass into heat pump 114. How much current goes through depends on the time in the sine wave half cycle at which the trigger is fired, since as will be remembered the silicon controlled rectifier opens each half cycle when voltage across it drops to zero. The more heat is needed, the greater the error signal and unbalanced voltage, and thus the sooner in the cycle buildup to the critical voltage takes place in capacitor 142 and the sooner "turn-on" time occurs. If near maximum cooling action is required, current passing through heat pump 114 may correspond thus to the single hatched portion of FIG. 8, the portion of each rectified sine wave to the left of the hatched area being excluded from the heat pump before firing of the trigger. If little cooling action is required, current passing through the heat pump may be made to correspond for example in wave appearance with the double hatched portions of the said figure, turn-ontime occurring late in each half cycle.

In either case, I have found that improved system stability results from temperature control through wave width modulation in this manner, particularly if only 80% of the wave width is used for heat pumping, as above noted. I have found that particularly good results accrue if the control range is so related to the width of the flat tops of the waves in the error-signalling means that throughout the entire control range, any trigger pulse must be fired in any cycle not before the flat top is reached in the error-signalling means, and not after it is exhausted therein.

To obtain maximum heat pumping capacity at maximum pulse width (time on=after essentially zero time) in this circuit, peak amplitude of the rectified heat pumping circuit sine wave should be set at 1.27 times the optimum current $I_{opt.}$, which is the steady rate current which produces maximum heat pumping.

While this circuit does not give the full stability, accuracy of control and linearity of the preferred embodiment, it is less expensive and gives substantial improvement over wide ranges over that available using unpulsed D.C. current for heat pumping. This circuit may of course be considerably varied within the scope of the invention. For example, efficiency can be improved by replacing the diodes 108 and 110 with silicon controlled rectifiers. Or, the power source for the system could be 110 v., for example, applied across the full wave bridge. Or, two way control can be achieved, for example by adding back connected silicon rectifiers and duplicating bridge, capacitor, and double diode transistor circuitry for firing and triggering them.

Other embodiments of the invention within the following claims will occur to those skilled in the art.

I claim:
1. A thermoelectric control system comprising:
an electrical power source,
a power control circuit energized by said electrical power source and including means to produce therefrom current in waves of intensity varying in regular periodicity and of at least selectively the same polarity,
a thermoelectric heat pump energized by said waves from said power control circuit,
a chamber in heat conducting relationship with said heat pump, and
a sensor associated with said chamber and delivering to said power control circuit a signal characteristic of the temperature in said chamber,
said power control circuit including also circuit means for selectively varying the portion of the width of said waves energizing said heat pump.
2. The system of claim 1 in which said power control circuit includes additionally circuit means to selectively change the polarity and frequency of said waves.
3. The system of claim 1 in which said waves are sine waves and in which during each half cycle the width of said waves is in the range from 0% to 80%, the remainder of each of said waves being clipped off along at least one parallel to the Y axis, and said remainder being adjacent at least one of the beginning and the end of said haft cycle.
4. The system of claim 1 in which said width is varied by clipping from the beginning of half-cycles along a Y axis.
5. A trigger circuit comprising:
an electrical power source for supplying alternating current,
electrical means for maintaining a constant cycle phase relationship between said alternating current in said trigger circuit and alternating current in a heat-pumping circuit,
rectifying means for acting on said alternating current to produce rectified alternating current,
electrical flat top wave producing means for producing waves with a flat top over at least a portion of their width,
a sensor responsive to temperature in a chamber,
error-signalling means for producing in association with said sensor and said electrical flat top wave producing means an electrical signal indicative of error relative to a desired temperature norm,
and pulsing means responsive to said error-signalling means for triggering said heating circuit at an appropriate time in said cycle.
6. The circuit of claim 5 in which said electrical flat top producing means includes a Zener diode.
7. The circuit of claim 5 in which said sensor is a thermistor and said error-signalling means includes a Wheatstone bridge including said thermistor for producing a voltage proportional to any error.
8. The circuit of claim 7 which includes a capacitor which is charged at a rate proportional to said voltage and electrical means actuated by said capacitor upon building thereon of a critical voltage to deliver a triggering pulse to close said heat-pumping circuit.
9. The circuit of claim 5 in which said time in said cycle is one at which waves are given a flat top by said electrical flat top producing means.
10. A thermoelectric control system comprising:
a direct current electrical power source,
a transformer energized thereby and including a power winding, a feedback winding, a control winding, and an output winding,
a pair of power transistors cooperating with said power winding and feedback winding in a saturated core oscillator circuit to generate unrectified square waves of alternating current, each half cycle being of opposite polarity, a control circuit including said control winding for rectifying current therethrough and error signal means in thermal communication with a chamber for response to any error of temperature therein from a norm, a heating trigger circuit for delivering a trigger pulse if said error is in one direction and at a time in said half cycle related to the amount of the error, a cooling trigger circuit for delivering a trigger pulse if said error is in the other direction and at a time in said half cycle related to the amount of the error, a heating circuit actuated responsive to said heating trigger for passing rectified current through a thermoelectric unit in a heating direction, and a cooling circuit actuated responsive to said cooling trigger for passing rectified current through said thermoelectric unit in a cooling direction.

11. A thermoelectric control system comprising:
an electrical power source,
a control circuit,
a heating trigger circuit,
a cooling trigger circuit,
a heating circuit, and
a cooling circuit, said control circuit, heating circuit, and cooling circuit including collectively circuit elements providing in each thereof mutually in phase rectified alternating current, said control circuit producing with said rectified alternating current therethrough and with not more than one of said trigger circuits per half cycle trigger pulses at times in half cycles of said alternating current dependent on the amount of error of temperature in a controlled chamber from a predetermined norm, said heating circuit and cooling circuit being responsive respectively to said heating trigger circuit and said cooling trigger circuit for passage of said rectified alternating current in respectively opposite directions through a thermoelectric unit.

12. The system of claim 11 in which said circuit elements constitute a transformer having a power winding in series with said electrical power source, which is a source of alternating current, a winding in series with said control circuit, a winding in series with said heating circuit, and a winding in series with said cooling circuit.

13. The system of claim 12 in which said source of alternating current comprises a battery in series with said power winding and defining with said transformer, a feedback winding therefor, and a pair of power transistors a saturated core oscillator.

14. The system of claim 11 in which said rectified alternating current is imposed on said control circuit in square waves at a first voltage, and in which said control circuit includes flat top clipping means for slightly reducing said first voltage to eliminate any variation in square wave voltage control circuit output owing to switching transients and power source variations.

15. The system of claim 11 in which said heating circuit and said cooling circuit are each in series with an operating winding of a transformer cooperating to provide said alternating current therethrough, said cooling circuit and heating circuit including each a center tap to said operating winding, a thermoelectric unit in series therewith, and a pair of spaced taps onto said operating winding connected respectively through a pair of gating elements in parallel with said thermoelectric unit, said pair of gating elements for each of said circuits being mounted for passage of current in a single direction but to be responsive to voltage of opposed polarities, more windings separating the cooling circuit spaced taps than the heating circuit spaced taps.

16. The system of claim 11 in which one of said heating trigger circuit and said cooling trigger circuit imposes a signal directly on one of said heating circuit and said cooling circuit respectively, and the other thereof imposes a signal on the other thereof through a pulse transformer.

17. The system of claim 11 in which said alternating current has a first amplitude in a cooling direction and a second and smaller amplitude in a heating direction.

18. The system of claim 17 in which said second amplitude is equal to 0.4 times said first amplitude, and in which a heat pumping unit in said heating and cooling circuit has an $I_{opt.}$ corresponding to said first amplitude.

19. A thermoelectric control system comprising:
an electrical power source for supplying alternating current at a lower voltage to a pair of main terminals, a center tap dividing said voltage into two portions 180° out of phase and connected with each of said main terminals through a separate diode, said diodes alternately blocking current to produce rectified alternating current acting in a heat-pumping circuit across a silicon-controlled rectifier and at least one thermoelectric element, said silicon-controlled rectifier,
said thermoelectric element, a transformer with its low-voltage side connected across said main terminals, for production of alternating current at a higher voltage, a full wave bridge with four diodes for producing a rectified alternating current therefrom, a Zener diode for clipping the tops from the waves of said rectified alternating current, a Wheatstone bridge including a thermistor responsive to temperature in a chamber to produce a voltage proportional to deviation of said temperature from a norm, an error-signal voltage amplifier, a capacitor for collecting charge from said voltage amplifier, and a double base diode actuated by said capacitor when said charge reaches a predetermined level, to trigger said silicon-controlled rectifier to close the same.

20. A thermoelectric control system comprising:
an electrical power source,
a control circuit,
a heating circuit,
a cooling circuit, and
a heat pump connected for selective functioning in one of said heating circuit and said cooling circuit, said heat pump being characterized by an optimum current $I_{opt.}$, said power source providing square wave voltages of regular periodicity and of amplitude to produce in said heat pump a current = ⅔ $I_{opt.}$, said control circuit causing each half cycle thereof to be placed across said heat pump when said system is in a cooling phase and only alternate half cycles thereof to be placed across said heat pump when said system is in a heating phase.

21. A thermoelectric control system comprising:
an electrical power source, a power control circuit energized by said electrical power source and including means to produce in regular periodicity therefrom current in square waves of selectively variable width and of at least selectively the same polarity, and including additionally circuit means to selectively change the polarity and frequency of said square waves, a thermoelectric heat pump energized by said square waves from said power control circuit, a chamber in heat conducting relationship with said heat pump, and a sensor associated with said chamber and delivering to said power control circuit a signal characteristic of the temperature in said chamber for selectively varying the width of said square waves.

22. A thermoelectric control system comprising:
an electrical power source for supplying alternating current,
rectifying means for acting on said alternating current to produce rectified alternating current,
at least one thermoelectric element connected for passage therethrough of said rectified alternating current,
signal responsive electrical switching means to selectively permit passage of said rectified alternating current therethrough and through said thermoelectric element,
a chamber, and
error signal means responsive to temperature in said chamber for actuating said switching means,
said switching means being normally open and being closed by said signal means, said switching means being opened each half cycle at voltage zero.

23. The control system of claim 22 in which said switching means is a silicon controlled rectifier.

24. A thermoplastic control system comprising:
an electrical power source for supplying alternating current,
rectifying means for acting on said alternating current to produce rectified alternating current,
at least one thermoelectric element connected for passage therethrough of said rectified alternating current,
signal responsive electrical switching means to selectively permit passage of said rectified alternating current therethrough and through said thermoelectric element,
a chamber, and
error signal means responsive to temperature in said chamber for actuating said switching means,
said error signal means being a portion of a trigger circuit electrically energized by said power source through a transformer.

25. A thermoelectric control system comprising:
an electrical power source for supplying alternating current,
rectifying means for acting on said alternating current to produce rectified alternating current,
at least one thermoelectric element connected for passage therethrough of said rectified alternating current,
signal responsive electrical switching means to selectively permit passage of said rectified alternating current therethrough and through said thermoelectric element,
a chamber, and
error signal means responsive to temperature in said chamber for actuating said switching means,
said rectifying means including a center tap and a pair of diodes.

References Cited in the file of this patent
UNITED STATES PATENTS

| | | |
|---|---|---|
| 2,986,009 | Gaysowski | May 30, 1961 |
| 3,036,188 | Ditto | May 22, 1962 |
| 3,048,764 | Murphy | Aug. 7, 1962 |
| 3,069,612 | Hamilton | Dec. 18, 1962 |

UNITED STATES PATENT OFFICE
CERTIFICATE OF CORRECTION

Patent No. 3,111,008                        November 19, 1963

Robert E. Nelson

It is hereby certified that error appears in the above numbered patent requiring correction and that the said Letters Patent should read as corrected below.

Column 1, line 51, for "conflct" read -- conflict --; column 2, line 9, for "linearlized" read -- linearized --; column 5, line 43, for "curse" read -- course --; column 8, line 32, for "haft" read -- half --; column 11, line 25, for "thermoplastic" read -- thermoelectric --.

Signed and sealed this 21st day of April 1964.

(SEAL)
Attest:

ERNEST W. SWIDER

Attesting Officer

EDWARD J. BRENNER

Commissioner of Patents